United States Patent

Chappell et al.

[15] 3,672,170
[45] June 27, 1972

[54] PROPELLANT GRAIN SUSPENSION SYSTEM

[72] Inventors: Robert N. Chappell; Robert L. Carroll, both of Redlands, Calif.

[73] Assignee: Lockheed Aircraft Corporation, Burbank, Calif.

[22] Filed: June 12, 1970

[21] Appl. No.: 45,770

[52] U.S. Cl. ............................................................60/255
[51] Int. Cl. ......................................................F02k 9/04
[58] Field of Search ................60/255, 39.47; 102/37.8, 101, 102/103

[56] References Cited

UNITED STATES PATENTS

| | | | |
|---|---|---|---|
| 2,986,001 | 5/1961 | Green | 60/255 |
| 3,120,184 | 2/1964 | Ellern | 102/37.8 |
| 2,522,113 | 9/1950 | Goddard | 60/255 |
| 3,121,993 | 2/1964 | Pennington | 60/255 |
| 3,136,120 | 6/1964 | Grosh | 60/39.47 X |

Primary Examiner—Mark M. Newman
Assistant Examiner—Richard Rothman
Attorney—George C. Sullivan

[57] ABSTRACT

A stress-free propellant grain suspension system wherein the propellant grain is suspended in the motor casing by means of a viscous liquid and the plenum gas pressure.

5 Claims, 4 Drawing Figures

PATENTED JUN 27 1972

3,672,170

ROBERT N. CHAPPELL
ROBERT L. CARROLL
*INVENTORS.*

BY *George C. Sullivan*

Agent

PROPELLANT GRAIN SUSPENSION SYSTEM

This invention relates to rocket motors of the solid propellant type, and more particularly to a suspension system for the propellant grain.

Many methods of grain suspension or retention have been proposed; however, those known to have been used have one thing in common: the grain is affixed to the motor case by means of an elastic or at least viscoelastic load path. The methods used include: (1) fully bonding the periphery of the grain to the case, (2) partially bonding the periphery to the case, (3) affixing the grain to the case through an expandable liner which can increase or decrease in volume as loads are applied through thermal expansion and contraction, 4) holding the grain in place with metal parts such as springs, and (5) holding it in place with potting compounds introduced in a plastic state and then cured to an elastic or viscoelastic state.

With the methods conventionally used, high stress and strain levels are induced by thermal cycling, shock, vibration and operational loads wherever the grain is bonded. These levels are within the strength capabilities of many propellants and bonds when all parts are properly made. However, if the bond or propellant are not well made, they may fail with catastrophic results. The strength capability of the propellants must be sufficient to withstand the stress and strain levels imposed. Retention systems which require the propellant to meet a given strength requirement necessarily limit the choice of propellants.

Because of the stress levels imposed, non-destructive inspection of present retention systems is necessary to insure proper bonds and propellant quality. This is done after the grain is in place and requires remote techniques such as x-ray and ultrasonic examination. These methods are time consuming, expensive and inaccurate. This is especially so when the integrity of complicated bond patterns or propellant grain geometry must be guaranteed.

In the case of end burning grains partially bonded to the case, combustion gas is allowed to flow in the unbonded areas to put the grain in equiaxial compression during burning. The presence of hot gases near highly stressed rubber inhibitors such as the cup can result in failure of the motor if the parts near the gas flow area have slight defects. This compounds the need for thorough inspection and careful manufacturing techniques.

These problems are overcome by the present invention wherein the propellant grain is separated from the case by a layer of a viscous liquid instead of being bonded to the case.

It is therefore an object of this invention to reduce strains and failure producing stresses to negligible levels in the solid propellant grain during extreme environmental and motor operation loading conditions.

A further object of the invention is to provide a propellant grain suspension or retention system which is simple and easy to manufacture.

Another object of the invention is to provide a suspension system which is applicable to both end burning and center perforated grains.

The foregoing and other objects and advantages will become apparent from the following description when taken with the accompanying drawings in which.

Figure 1:
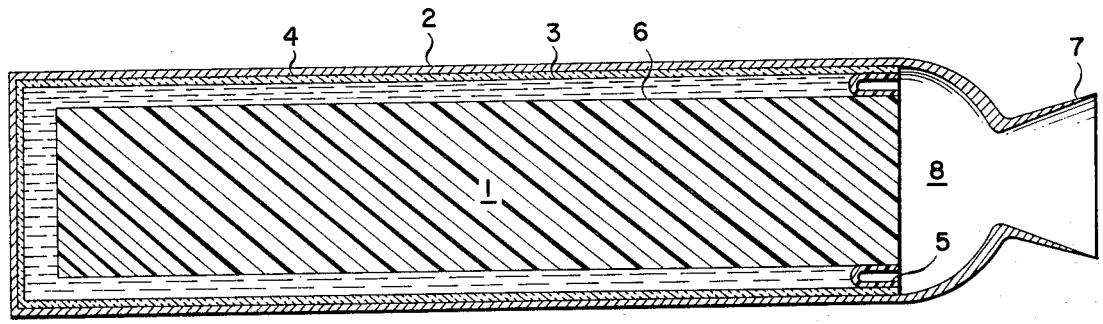
FIG. 1 is a longitudinal section of a rocket motor embodying the invention.

With reference to FIG. 1, a propellant grain 1 is shown in a case 2 surrounded by liquid in an annulus 3 and insulation 4 except on the rear face. A seal 5 retains the liquid in the annulus. A cup 6 which may be made of rubber is between the liquid and the grain. A nozzle closure 7 maintains pressure in the nozzle plenum 8.

The supporting liquid and the plenum pressure retain the grain. The flexible seal serves only to retain the liquid and is under very little load except momentarily at ignition. The key concept in this retention system is that of a controlled response to loading conditions. The system might be compared to an oil filled shock absorber in which the oil viscosity and orifice size dictate how the shock absorber responds to load. By varying these two parameters, the shock absorber may be designed such that it will move easily under slowly applied loads and yet resist rapidly applied, short duration loads with only small movements.

Figure 2:
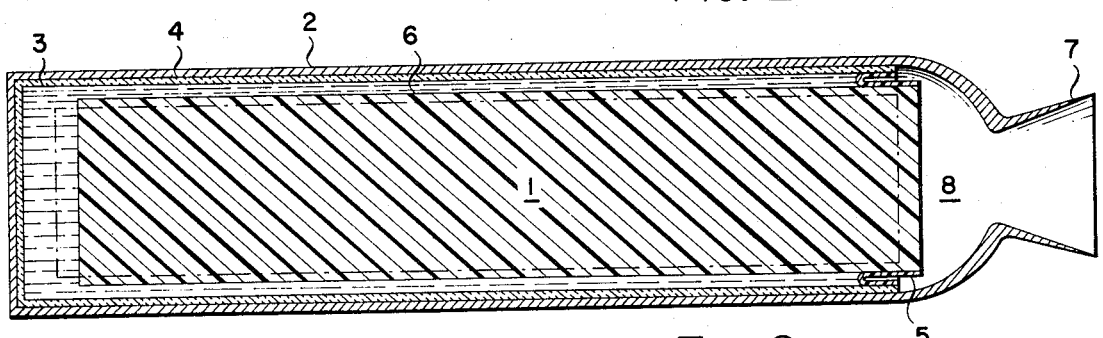
FIG. 2 is a longitudinal section as in FIG. 1 showing the hot grain position by solid lines and the average temperature position superimposed in broken lines.
Figure 3:
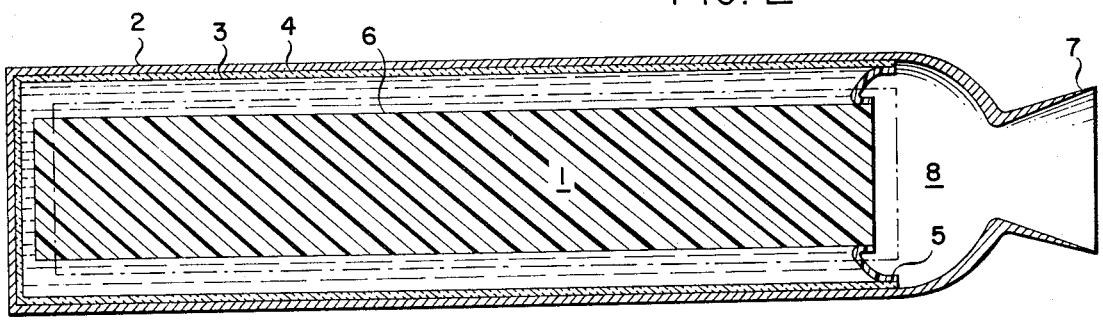
FIG. 3 is a longitudinal section as in FIG. 1 showing the cold grain position by solid lines and the average temperature position superimposed in broken lines.

The present system in accordance with the invention makes use of these shock absorber-like characteristics, which are ideally suited to the needs of a grain retention system that must resist movement during events of short duration (seconds) such as vibration, shock, acceleration and pressurization and allow stress relief during events of long duration (hours) such as thermal cycling. FIGS. 2 and 3 illustrate the system response to a thermal cycle which occurs as the motor heats and cools. Typically, the propellant expands and contracts approximately ten times as much as the case. As a result, the case has a relatively constant volume and the grain volume changes.

In FIGS. 2 and 3, for example, the broken line position illustrates the grain at an initial normal temperature of 70°F and the solid line represent the hot and cold positions, respectively. As the grain expands and closes the sidewall annular clearances (FIG. 2), the supporting liquid is forced forward slowly into the head end and in turn the grain is forced aft. Conversely, as the motor cools and contracts (FIG. 3) the annulus enlarges, which draws the supporting liquid slowly into the annulus and the grain is pushed forward by plenum pressure. Strains and stresses induced in the grains are essentially zero during thermal cycling, since the grain does not change in shape or deform as its volume contracts or expands with temperature change.

Under long-term storage in a horizontal position, the grain will tend to sink to the bottom of the motor chamber or float to the top, depending on the relative densities of the liquid and propellant. Because of the small annulus width (50–60 mils), the center of gravity shift on most motors will be well within tolerances dictated by present day guidance systems. Transverse acceleration during captive flight will have the same effect as long-term storage in the horizontal position.

When the motor is stood in the vertical position during handling or storage or is accelerated longitudinally during captive flight, the grain is held in place by the plenum pressure with the help of the flexible seal. The pressure differential across the flexible seal is proportional to the difference in density between the grain and the liquid. If the materials are the same density, the pressure differential across the seal is zero and the seal serves only to separate the liquid and the plenum gas. If the liquid is less dense than the grain, the seal is pushed inward toward the liquid. If the liquid is more dense than the grain, the seal is pushed outward toward the plenum.

Vibration loads which are imposed on the motor case must pass through the supporting liquid to reach the grain. This load path tends to isolate the grain from the environment. In addition, the grain cannot vibrate in any of its natural modes without moving with respect to the case. As it attempts to move, the supporting liquid must be displaced through the narrow (approximately 50 to 60 mils) annulus between the cup and insulation. This provides a very strong damping effect which has been verified by a series of vibration tests performed in a structural analog in which essentially no magnification of case motion was observed in the grain.

Short duration acceleration loads may be classified as shock loads. The retention system depends upon the viscosity of the supporting liquid and the annulus size to restrict longitudinal motion resulting from these loads. Long duration longitudinal acceleration loads are supported by the plenum pressure. Transverse accelerations are of little consequence because the grain may be supported by the case wall if necessary.

Several seconds after initial motor pressurization, the cup remaining in the combustion plenum burns through and the seal erodes away. The grain continues to burn with a minimum of 3 inches of unburned cup trailing the grain.

Forward acceleration of the motor imposes an inertia force on the grain, tending to move it aft with respect to the motor case. Grain movement can occur only if the supporting liquid flows forward or if voids form in the liquid at the head end. The latter possibility cannot occur because of the high motor operating pressure which is transmitted hydraulically throughout the motor and prevents void formation. Thus, grain movement is limited by the rapidity with which the liquid can move forward. By adjusting the liquid viscosity and the annulus width, the velocity of liquid movement can be made less than the burn rate of propellant, and the presence of liquid in the annulus throughout burn can be assured.

Throughout operation, hot gasses are confined to the combustion chamber so that the grain does not require protection from the flame as is required in partially bonded retention systems.

Figure 4:
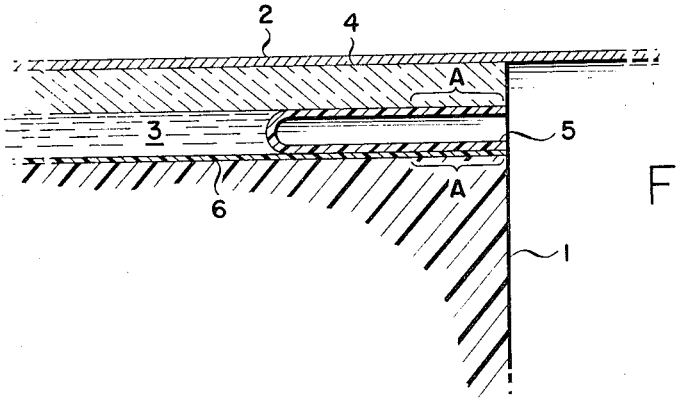
FIG. 4 is a fragmentary sectional view of the propellant-case of FIG. 1 and showing the sealing arrangement.

FIG. 4 represents a seal arrangement for the motor. In this, the seal is bonded to the insulation and grain cup in the areas indicated at A. This seal is simple and easy to fabricate.

Simplicity and reliability are enhanced by the small number of components, the minimization of critical bond lines and the ability to inspect at the component level. The grain can be cast in place, and in the absence of a bond, the annulus will be developed as the grain shrinks during cure and cooling from cure temperature. The seal is installed and inspected prior to casting the propellant. The liquid is added after the propellant is cured.

The grain can also be cartridge loaded with the case acting as the mold. In this approach, the grain can be removed for inspection after cure, and the seal installed and inspected after the grain is replaced in the motor. Again the liquid is the last component added. Should the grain be found to be defective at any time before actual firing, it can be replaced without replacing or repairing the motor insulation.

A wide variety of liquids can be used to support the grain. The choice depends upon physical and chemical compatibility with the particular motor utilizing the retention system. For example, the viscosity must fit within a range which is limited by thermal cycling requirements as an upper bound and shock, vibration and flight acceleration requirements as a lower bound. Since many motors must operate over wide temperature ranges, viscosity should not change rapidly with temperature. Viscous polymers such as silicone stocks, used as foundations for greases have been used successfully because their viscosity remains relatively constant over a wide temperature range, and they are available in a wide range of viscosities. Chemical compatibility is also important because constituents from the liquid must not migrate into the cup and insulation nor may constituents from the latter migrate into the liquid.

Typically, viscosities may range from about 10,000 to 200,000 centistokes and the annulus width from less than 0.030 inch to about 0.1 inch.

When the densities of the liquid and propellant match, the grain will not tend to move with respect to the motor case under longitudinal acceleration, shock and vibration loads. Therefore, part of the lower bound on liquid viscosity is removed. Transverse loads still result in movement of the grain with respect to the case, however, because of the flexibility of the seal. Thus, the liquid density has a secondary effect on viscosity requirements. However, less dense liquids result in higher mass fractions and it is advantageous on most designs to use a less dense liquid with a higher viscosity.

It should be apparent that the described system is applicable to centerperforated grains as well as the end burning grain. The significant feature is that the annulus vary as the grain contracts and expands. The grain may be configured to any shape internally and still receive stress relief from the present system.

What is claimed is:
1. A rocket motor comprising a motor casing, an insulator bonded to the casing, a solid propellant grain in the casing, a resilient inhibitor cup bonded to the periphery and front end of the grain, a viscous liquid between the insulator and the cup, a flexible annular seal between the cup and insulator at the rear of the grain for retaining the liquid, with the rear side of the seal exposed to plenum pressure of the motor.

2. A rocket motor as defined by claim 1, wherein the liquid is a viscous polymer.

3. A rocket motor as defined in claim 1, and wherein the liquid density approximates the density of the grain.

4. A rocket motor as defined in claim 1 wherein the grain is end burning.

5. A rocket motor as defined by claim 1 wherein the viscous liquid is a silicone oil.

* * * * *